Patented Feb. 21, 1939

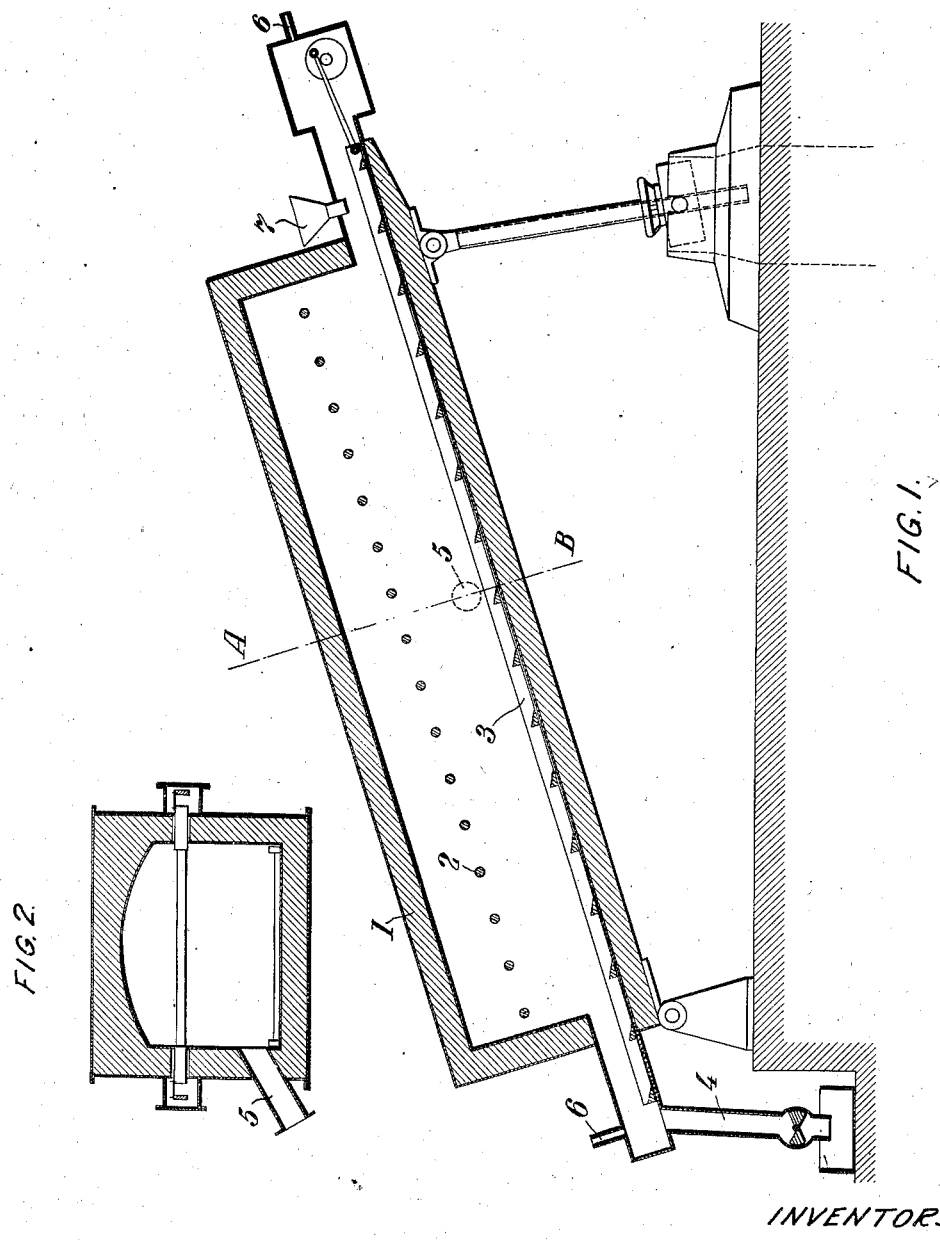

2,148,358

UNITED STATES PATENT OFFICE 2,148,358

PROCESS FOR THE PRODUCTION OF MAGNESIUM

Hermann Lang, Robert Suchy, and Hellmuth Seliger, Bitterfeld, Germany, assignors, by mesne assignments, to Magnesium Development Corporation, a corporation of Delaware Application December 21, 1934, Serial No. 758,636
In Germany December 22, 1933

5 Claims. (Cl. 75—10)

The present invention relates to a process for the production of volatilizable metals particularly of magnesium.

The thermal production of magnesium, by reducing magnesium oxide, or substances containing same, with reducing agents such as calcium carbide, aluminium, silicon and the like has hitherto been carried out in externally heated iron retorts or muffles, or in electrode furnaces. Although, in the latter case, the improved utilization of the heat, as the result of the internal heating, constituted an advantage, the possibility of carbon monoxide being formed through the oxidation of the electrodes, gives rise to losses due to the reoxidation of the metal. Both the aforesaid processes are attended with the drawback that the supply of heat, and thus also the disengagement of magnesium vapours is not uniform throughout the entire reacting mass. To this end, according to the invention the disengagement of magnesium from the reaction mixture is effected substantially by means of radiant heat, the reaction mixture preferably in the form of a thin layer being moved relatively to heat radiators which are disposed adjacent to but out of contact of the reaction mass. For heating the radiators which may be constructed for example of carbon, graphite, molybdenum, silicon carbide or chromium alloys, acting as resistors, an electric current is employed.

The reaction mixture, which is advantageously employed in the form of briquettes, is preferably conveyed by mechanical means, the hearth, on which the reaction mixture is spread, being either moved as a whole along, but at a definite distance from, the series of radiators, or the reaction mixture being moved over the stationary hearth, and while being continually stirred, by a movable grate, somewhat of the type of the known Redler grate.

The herein described process ensures that the heat is efficiently utilised and that the magnesium vapour is liberated from the reaction mixture in a highly uniform manner. The process can also be arranged to operate continuously by feeding the reaction mixture, and also withdrawing the reaction products from the furnace in a continuous manner, double valves if necessary being provided for this purpose, and is therefore suitable for being carried out on a large manufacturing scale.

In order more clearly to understand the invention, reference is made to the accompanying drawing, which illustrates diagrammatically and by way of example, one embodiment of apparatus suitable for carrying the same into practical effect, and in which:

Fig. 1 is a longitudinal section; and
Fig. 2 is a cross section along the line A—B of Fig. 1.

The apparatus shown comprises a muffle furnace 1 lined with magnesite blocks, in the vault of which a row of electrically heated silicon carbide rods 2 is mounted transversely to the longitudinal axis. The reaction mixture after being charged through the inlet 7 is carried, by the conveyor 3, over the hearth and to the outlet 4, whilst the liberated magnesium vapours are led away, through the pipes 5, to the condensing plant. The silicon carbide rods 2 are connected with the electric current supply by means of the leads 8.

By the introduction of an inert gas, such as hydrogen, at 6, a moderate positive pressure, which prevents the access of air, is maintained in the furnace.

We claim:

1. A process for the production of magnesium from reaction mixtures comprising a substance containing magnesium oxide and a reducing agent yielding non-gaseous oxidation products, which process comprises heating a thin layer of said reaction mixture in the presence of an inert gas by means of radiant heat to temperatures below the melting point of the reaction residue while moving said layer past but without bringing it into contact with the source of said radiant heat and while continuously stirring said reaction mixture.

2. A process for the production of magnesium from reaction mixtures comprising a substance containing magnesium oxide and a reducing agent yielding non-gaseous oxidation products, which process comprises heating a thin layer of said reaction mixture in the presence of an inert gas by means of radiant heat to temperatures below the melting point of the reaction residue while moving said layer past but without bringing it into contact with the source of said radiant heat and while continuously stirring said reaction mixture, the radiant heat being generated by passing an electric current through conducting elements which are not volatilized at the temperatures of the reaction.

3. A process for the production of magnesium from reaction mixtures comprising a substance containing magnesium oxide and a reducing agent yielding non-gaseous oxidation products, which process comprises heating a thin layer of briquettes of said reaction mixture by means of radiant heat to temperatures below the melting point of the reaction residue while moving said briquettes past but without bringing them into contact with the source of said radiant heat and while continuously stirring said reaction mixture.

4. A process for the production of magnesium from reaction mixtures comprising a substance containing magnesium oxide and a reducing agent yielding non-gaseous oxidation products, which process comprises heating a thin layer of briquettes of said reaction mixture by means of radiant heat to temperatures below the melting point of the reaction residue while moving said briquettes past but without bringing them into contact with the source of said radiant heat and while continuously stirring said reaction mixture, the radiant heat being generated by passing an electric current through conducting elements which are not volatilized at the temperatures of the reaction.

5. A process for the production of magnesium from reaction mixtures comprising a substance containing magnesium oxide and a reducing agent yielding non-gaseous oxidation products, which process comprises heating a thin layer of said reaction mixture in the presence of an inert gas by means of radiant heat supplied from resistors selected from the group carbon, graphite, molybdenum, silicon carbide, or chromium alloys, said reaction mixture being heated to temperatures below the melting point of the reaction residue while moving said layer past but without bringing it into contact with the source of radiant heat and while continuously stirring said reaction mixture.

HERMANN LANG.
ROBERT SUCHY.
HELLMUTH SELIGER.